United States Patent

[11] 3,593,283

[72] Inventors Yoshikazu Miyamoto
Hachioji-shi;
Masao Hibi, Kodaira-shi, both of, Japan
[21] Appl. No. 668,798
[22] Filed Sept. 19, 1967
[45] Patented July 13, 1971
[73] Assignee Hitachi, Ltd.
Tokyo-to, Japan
[32] Priority Sept. 19, 1966
[33] Japan
[31] 41/61388

[54] FEATURE-EXTRACTING SYSTEM FOR PATTERN-RECOGNITION APPARATUS AND THE LIKE
14 Claims, 13 Drawing Figs.

Figures 1A, 1B:
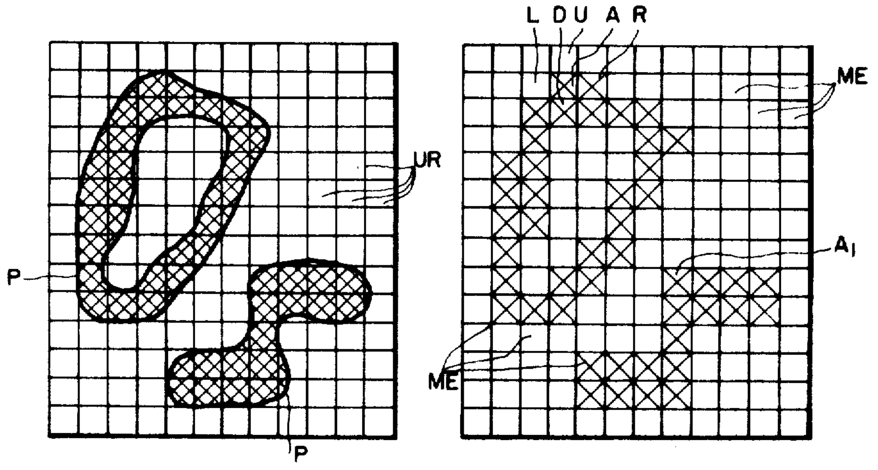

[52] U.S. Cl. 340/146.3
[51] Int. Cl. G06k 9/06
[50] Field of Search 340/146.3; 235/92

[56] References Cited

UNITED STATES PATENTS 3,069,079 12/1962 Steinbuch et al. 340/146.3 X
3,106,698 10/1963 Unger 340/146.3 X
3,178,688 4/1965 Hill et al. 340/146.3
3,214,574 10/1965 Landsman et al. 235/92

*Primary Examiner*—Maynard R. Wilbur
*Assistant Examiner*—Leo H. Boudreau
*Attorney*—Craig, Antonelli, Stewart & Hill ABSTRACT: This specification discloses a feature-extracting system for the use in so-called pattern-recognizing apparatus and the like. The system is provided with a memory composed of a number of memorizing circuits arranged in matrix form, each of which is selectively electrically coupled with the adjoining memorizing circuits. When a pattern to be recognized is memorized in the memory by means of partial features thereof and the memorizing circuits are scanned sequentially, all of the circuits which memorize a partial figure of the pattern are caused to invert in chain reaction. By counting a counting signal produced only when an initial one of the memorizing circuits which have memorized the quantized partial features of the partial figures of the pattern is scanned, it is possible to determine the number of partial figures forming the pattern to be recognized.

FEATURE-EXTRACTING SYSTEM FOR PATTERN-RECOGNITION APPARATUS AND THE LIKE

This invention relates to a system for extracting features of pattern and is adapted for use in so-called character-reading or pattern-recognizing apparatus.

In the conventional character-reading apparatus, it is customary to extract features of a pattern to be recognized for the purpose of using these features as fundamental information for reading or recognition of the pattern. According to the conventional system, it is relatively easy to extract simple features such as the presence or absence of straight lines, the direction or length of the same, or the presence or absence of curved lines. However, it is difficult to extract other features in a simplified manner and at high speed, viz., whether or not a pattern within a certain zone includes figures composed of a closed curve, whether or not such pattern is separated into certain partial figures, or how many are the figures so divided. For example a system has been proposed, according to which the pattern is scanned by means of a flying spot scanner or the like, and thereafter the features thereof are extracted by an electronic computer. However, this known arrangement calls for a highly complicated process and hence an apparatus of enormous scale and huge cost. Another type of system has been proposed also, according to which the pattern is scanned radially from a certain central point to detect the crossings of the scan lines with the pattern, whereby the presence of closed curves is indirectly recognized. The latter system is also disadvantageous because the determination of the central point is rendered difficult when the position of the closed curve on the pattern is uncertain, or when the number of figures is changeable and because partially opened curves, such as the letter "C" may be confused with completely closed curves.

It is therefore a principal object of the present invention to provide a system whereby the features, such as the presence or absence of separate figures and closed curves and the number of such separate figures or closed curves can be easily extracted.

Another object of the present invention is to provide a system which permits the extraction of pattern features simply, exactly and rapidly.

Still another object of the present invention is to provide a system for feature extraction adapted to be combined with a different type of pattern-feature extracting system to constitute an inexpensive pattern-recognizing apparatus.

In order to achieve the objects above given, the system according to the invention has a plurality of memory elements arranged in matrix form which memorize partial feature signals quantized every predetermined unit region, the output terminal of each element being electrically coupled with the input terminals of adjacent memory elements. As an order signal for reading out is applied to one of the memory elements which memorizes a partial feature signal of a partial figure, the element is caused to invert to cancel the memorized signal, and, at the same time, an output signal is introduced into the adjacent memory elements. In this way all of the contiguous memory elements which memorize partial feature signals of the partial figure are inverted in a chain reaction following the initial inversion of any one element, with consequent erasure of the memorized information, and an output signal is derived from each chain reaction inversion. For this reason, if the readout order signals are sequentially introduced in the respective memory elements by some suitable scanning means, outputs corresponding in number to the number of the partial figures of pattern can be obtained.

In another embodiment of the invention, the memory elements are caused to memorize the negative feature signals of a pattern whose features must be extracted. In this case, whether the pattern includes closed curves or not can be detected by scanning means similar to the one above mentioned. Accordingly, with a suitable combination of the two memorizing means (positive and negative) the number of partial figures and/or closed curves in the pattern can be detected.

Figure 3:
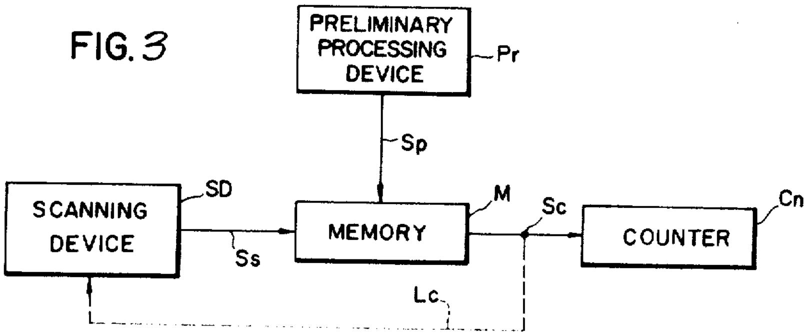
Figure 4:
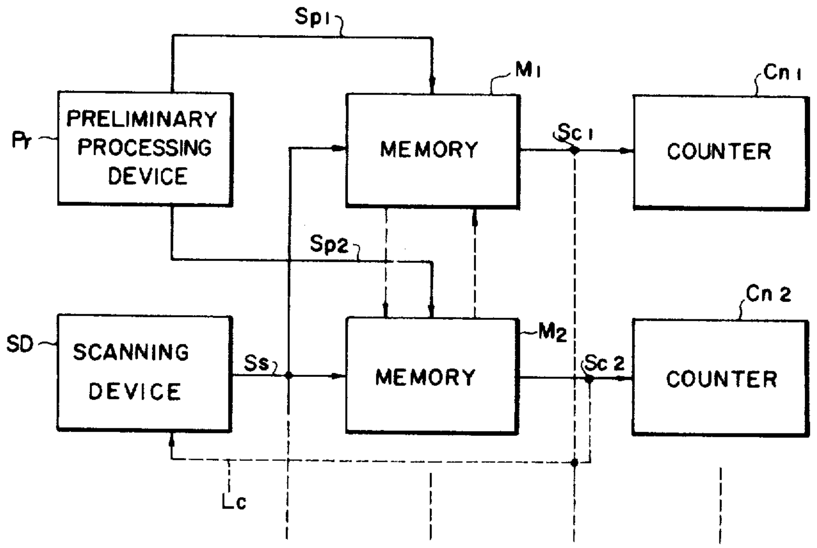
Figure 5:
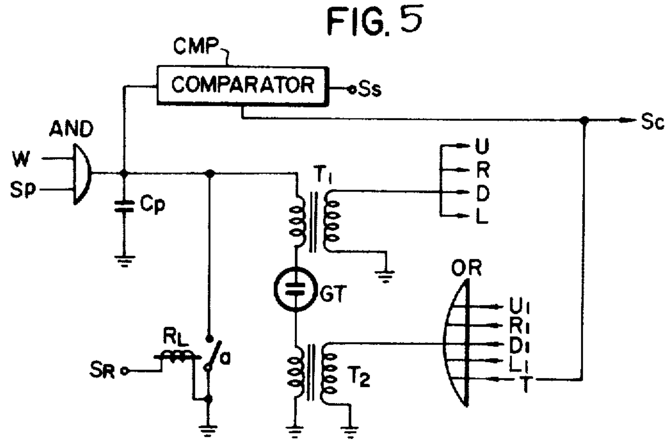
Figure 6:
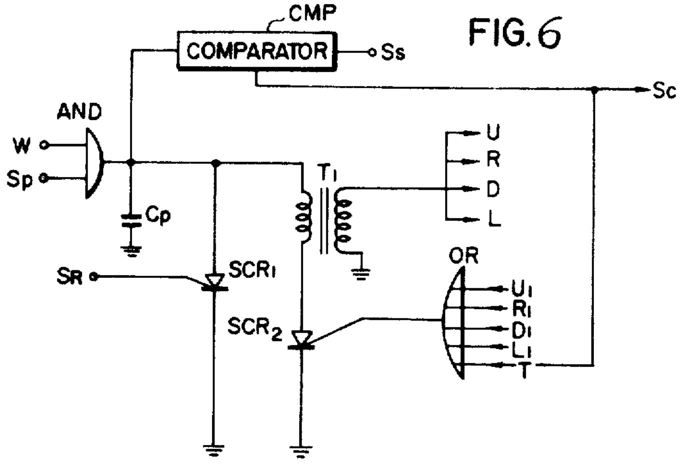
Figure 7:
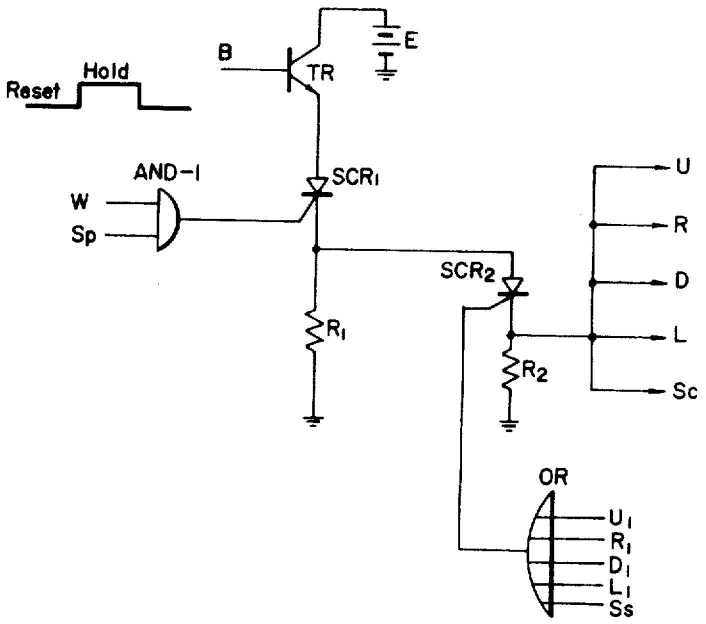

These, as well as additional objects and advantages of the present invention will become more apparent from the following description when taken in connection with the accompanying drawings, in which:

FIGS. 1*a* through 1*d* and 2*a* through 2*d* are different sets of patterns explanatory of the principles of the invention;

FIGS. 3 and 4 are schematic diagrams showing two different embodiments of the invention; and FIGS. 5 through 7 are schematic circuit diagrams showing several examples of a memorizing circuit in accordance with the invention.

Referring now to FIGS. 1*a* through 1*d* which provide a set of views illustrating the principles of the feature-extracting system of the invention, partial features of a pattern which are to be extracted are quantized in the form of electrical signals for every one of a multiplicity of predetermined unit regions on the pattern by suitable known means, such as scanning means or a number of photoelectrical conversion elements arranged in the form of a matrix, though not shown in detail.

In FIG. 1*a*, symbol UR represents unit regions partitioned by longitudinal and lateral straight lines, and symbol P indicates, for example, two partial figures which constitute a single pattern, the features of which are to be extracted. The quantized feature signals are memorized by a memory to be described later.

FIG. 1*b* illustrates the operative state of the memory in which the pattern shown in FIG. 1*a* is memorized. In the figure, symbol ME indicates a multiplicity of memory elements constituting the memory and which correspond respectively to the unit regions UR in FIG. 1*a*. The output terminal of each each memory element ME is electrically coupled with the input terminals for readout order signals of the other memory elements which are longitudinally and laterally contiguous thereto, as will be described later. Therefore, as a readout order signal is introduced into a certain memory element and the information memorized by the element is readout, the signal so readout is applied as a readout order signal to the other elements adjacent to said first element. Thus, upon introduction of a single readout order signal into a certain memory element, the adjacent memory elements are inverted in their state through a chain reaction. The memory elements are so constructed that they can be inverted by the readout signal only when they memorize the presence of picture elements of pattern and that, once inverted, they would not be inverted again by the introduction of another readout order signal. In FIG. 1*b*, memory elements designated with a symbol X indicate the memory elements which have detected the presence of a picture element of pattern.

Figure 1C:
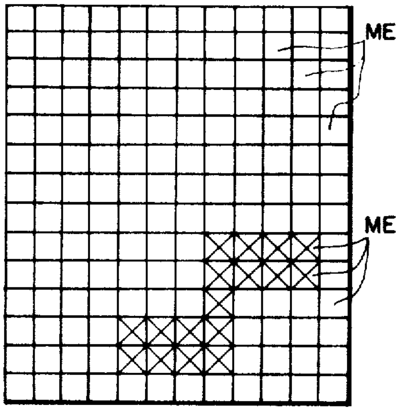

It is now assumed that a readout order signal is introduced into the memory elements ME by suitable scanning means starting from the upper left corner of FIG. 1*b* in a certain regular scanning sequence, such as from left to right. As long as the readout order signal is applied to the memory elements which have not detected the presence of a picture element of the pattern or, stated differently, to those which record the absence of a pattern element, the memory as a whole will remain in the same state. Only when the readout order signal is introduced into the first memory element which memorizes the presence of any one picture element of the pattern (i.e., memory element A in FIG. 1*b*), the memory element will be inverted in state. Thus, an output signal is generated from the memory element A and is applied to the adjacent memory elements, such as the element U thereabove, the element D therebelow, the element L on the left and the element R on the right. While the memory elements U and L have not recorded elements of the pattern and hence undergo no change, the memory elements D and R are inverted and produce output signals. In such a way, only the memory elements in longitudinally and laterally neighboring relations which memorize the presence of a picture element are inverted in a chain reaction until the state as shown in FIG. 1*c* is attained. Scanning is kept on and as the readout order signal is introduced into the first memory element $A_1$ which memorizes the partial figure P on the lower right of FIG. 1*b*, all of the adjacent memory elements which memorize the presence of the picture elements are inverted similarly as above so that the memorized information is then completely erased.

If a suitable counter is so set that it functions only when the memory elements A and $A_1$ are inverted, i.e., when the first memory element of each partial figure is scanned, then it becomes possible to know from the counted value on the counter how many partial figures constitutes a particular pattern. Also, from the positions of the memory elements which were first inverted for the respective partial figures, it is possible to detect roughly where the respective partial figures are located.

Figure 1D:
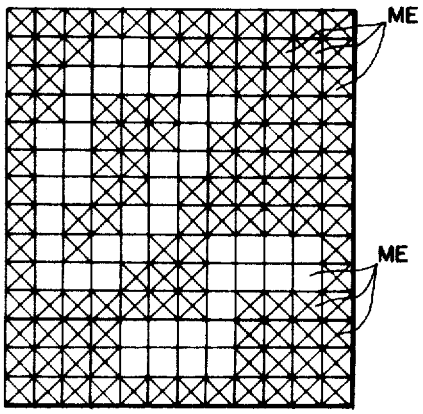

As shown in FIG. 1*a*, the left one of the two partial figures P is composed of a closed curve. By the procedure described above, it is impossible to detect the presence and the number of such closed curves. To discriminate them, it is desirable to use a negative pattern of the pattern shown in FIG. 1*a*. FIG. 1*d* shows the condition of the memory which memorizes the negative pattern. Exactly in the same way as has already been described in connection with FIG. 1*b* and FIG. 1*c*, the number of partial figures of the negative pattern which form a closed curve can be detected. The number of partial figures minus one corresponds to the number of the closed curves. In the example shown, the number is one. Thus, with both a positive and negative pattern, both the number of partial figures and the number of partial figures which form a closed curve can be accurately and simply detected.

Figure 2B:
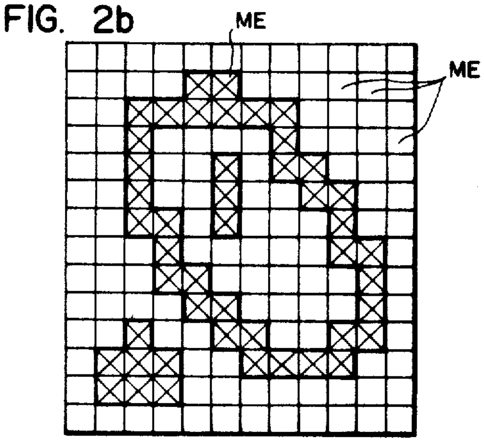
Figure 2A:
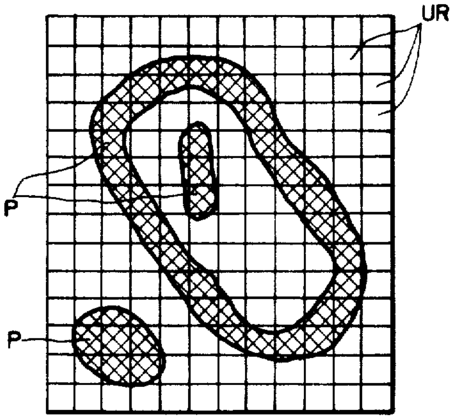
Figure 2C:
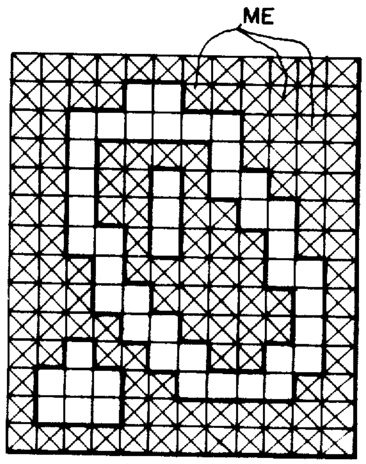
Figure 2D:
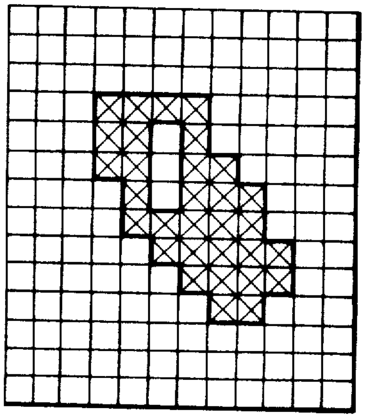

FIGS. 2*a*—2*d* provide a set of views similar to those of FIG. 1 for illustration of further principles of the invention. A pattern as shown in FIG. 2*a* whose features are to be extracted is quantized by predetermined unit regions and is memorized by a memory which is composed of a multiplicity of memory elements ME, as shown in FIG. 2*b*. Meanwhile, a negative pattern of the above pattern is also quantized and memorized by a separate memory as shown in FIG. 2*c*. With respect to the memories as shown in FIG. 2*b* and FIG. 2*c* scanning is accomplished as described in connection with FIG. 1*b* whereby the number of partial figures of the pattern and the number of the closed curves can be detected in the same manner as already described, but whether each closed curve has another independent figure therein as shown in FIG. 2*a* for an example is not known in this case. However, in the memory illustrated in FIG. 2*c*, when the neighboring memory elements ME which indicate the presence of the outermost picture element have been inverted as shown in FIG. 2*d*, the presence of another figure in the closed curve can be detected by allowing the other memory to memorize the negative pattern which is obtained by inverting the pattern represented by the rest of the memory elements in FIG. 2*d*. Thus, by the repetition of pattern inversion, the pattern features such as multiple loops which have hitherto offered no small difficulties in detection can be readily detected.

Although in FIGS. 1*a* through 1*d* and 2*a* through 2*d*, the individual memory elements ME are shown as coupled only with the memory elements immediately adjacent thereto in the longitudinal as well as lateral directions, it is also possible to electrically couple the memory elements with those some distances apart therefrom, for example with those neighboring in the oblique directions and those skipping over one element therearound, thereby providing a system capable of extracting the features of a pattern without error even in such case when the original pattern is somewhat blurred or dimmed along the edges and the edges which should be continuous are actually broken off. Also, the memory elements of course need not be arranged in an orderly manner on a plane, as shown, but the arrangement may be modified if necessary.

FIG. 3 shows a schematic diagram of an embodiment of the invention. In the figure, a preliminary processing device *Pr* for processing the quantized pattern signal from the photoelectric conversion device (not shown) is composed, for example, of a buffer register consisting of a number of flip-flop circuits each corresponding to a respective photoelectric conversion element. One set of feature signals $S_p$ indicating the positive pattern can be obtained from the positive output terminals of the respective flip-flop circuits, and, in contrast to this, another set of feature signals $S_p$ indicating the negative pattern can be obtained from the negative output terminals thereof. On the other hand, either the positive or negative feature signals $S_p$ can be also obtained by using a device $P_r$ composed of an amplifying circuit consisting of amplifiers which do not cause the signals from the photoelectric conversion elements to invert in phase, or of amplifiers of phase inversion-type. The feature signals $S_p$ are introduced from the device *Pr* to a memory M, wherein the pattern (either positive or negative) is memorized. Into this memory M scanning signals $S_S$ from a scanning device SD are successivlely introduced and the partial features of the pattern are readout from the memory elements which constitute the memory M, and counting signals $S_C$ indicating the number of the partial figures are produced and counted by the counter *Cn*. The loop $L_C$ indicated by dotted line is used to supply the scanning device SD with the signal $L_C$ which is produced each time the counting signal $S_C$ is applied to the counter *Cn*, in order thereby to bring the scanning device SD to a temporary stop or to detect the scanning position at the point where the counting signal $S_C$ is generated. The loop is thus not essential, but does perform an advantageous and useful purpose.

FIG. 4 is a schematic diagram of another embodiment of the invention capable of detecting the number of closed loops of a pattern in addition to the number of partial figures. The embodiment has a plurality of memories $M_1$, $M_2$, and so forth and counters $Cn_1$, $Cn_2$, and so forth. By way of a preliminary processing device *Pr*, the memory $M_1$ is caused to memorize, for example, a positive pattern, while the memory $M_2$ is caused to memorize a negative pattern, and both memories $M_1$ and $M_2$ are scanned by a scanning device SD. Thus, on the basis of the information from the counters $Cn_1$ and $Cn_2$, the number of partial figures, the number of closed curves, and the like of the pattern can be detected all at the same time. Further, as the counters $Cn_1$, $Cn_2$, and so forth count out the counting signals $S_{C1}$, $S_{C2}$, and so forth, it is possible to stop the scanning device SD momentarily by the signals $L_C$, transfer the information memorized, for example, by the memory $M_1$ or $M_2$ through inversion to the other memory $M_2$ or $M_1$, and then resume the scanning, thereby to detect the presence of closed curves or a complicated pattern such as a multiple loop. The memories $M_1$, $M_2$, and so forth need not be coupled in the same way among the neighboring memory elements thereof, but individual memories may have the elements coupled differently so that they may extract different features.

FIG. 5 is a schematic circuit diagram showing one example of memorizing circuits according to the invention. Upon introduction of a resetting signal $S_R$, a relay $R_L$ is actuated and closes the contact *a*, whereby the load on a capacity element $C_P$ is discharged If a quantized feature signal $S_P$ from the processing device *Pr* shown in FIGS. 3 and 4 is introduced when a gate signal W representing a write-in order signal is applied, the capacitor Cp is charged via an "AND" circuit AND and, if a scanning signal *Ss* from scanning device SD shown in FIGS. 3 and 4 is applied, a trigger signal T as the output of a comparator CMP is introduced to a discharge tube GT through an "OR" circuit OR and a transformer $T_2$. The output of the comparator CMP is produced when the capacitor Cp is charged. As a result, the voltage applied to the discharge tube is caused to increase from the voltage given by the capacity element $C_P$ to a value large enough to establish discharge through the tube. Thus, the capacity element $C_P$ is discharged, and a voltage variation is produced across the secondary winding of a transformer $T_1$ and is supplied to the neighboring memory elements, that is, upper, right, lower and left memory elements as readout signals U, R, D, and L. When the feature signal $S_P$ indicates the absence of the picture element, or when the amplitude is zero, the capacity element $C_P$ is not charged and no output signal is obtained even though an input signal is supplied to the transformer $T_2$. Here, symbol $S_C$ designates a counting signal to the counter *Cn* shown in FIGS. 3 and 4.

Also, the same operation is induced by signals $U_1$, $R_1$, $D_1$, and $L_1$, from the neighboring memory elements, that is, upper right, lower and left memory elements, but no counting signal $S_C$ is produced in this case due to absence of a scanning signal applied to the comparator CMP. Inversion in FIG. 5 is performed by the discharge capacitor Cp.

FIG. 6 is a circuit similar to the circuit of FIG. 5 showing a modified embodiment of the above memorizing circuit for use in accordance with the present invention. The embodiment shown differs from the one of FIG. 5 only in that the relay $R_L$ and discharge tube GT are replaced by silicon controlled rectifiers $SCR_1$ and $SCR_2$, respectively. A resetting signal $S_R$ is introduced into the gate terminal of the rectifier $SCR_1$ and readout order signals $U_1$, $R_1$, $D_1$, $L_1$, and T are introduced into the gate terminal of the rectifier $SCR_2$ through the "OR" gate OR.

Still another embodiment of the memorizing circuit in accordance with the invention is shown in FIG. 7 in the form of a schematic circuit diagram. It has no capacity element nor transformer, but is composed of a transistor TR and silicon controlled rectifiers $SCR_1$ and $SCR_2$. In order to actuate this memory element, a suitable holding voltage is applied to the base terminal B of the transistor TR thereby to establish continuity through the transistor TR. When a feature signal $S_p$ indicating the presence of a pattern to be extracted is introduced into the gate terminal of a silicon controlled rectifier $SCR_1$ by way of "AND" circuit AND-1, this rectifier is actuated thereby and kept conductive. Next, when a scanning signal $S_S$ or one or more output signals $U_1$, $R_1D_1$, and $L_1$, from the neighboring memory elements are introduced into the gate terminal of a silicon controlled rectifier $SCR_2$ via an "OR" circuit OR, a second silicon controlled rectifier $SCR_2$ is caused to be conductIve because the voltage E is applied to $SCR_2$ as long as $SCR_1$ is rendered conductive, and the voltage drop caused by a load resistance element $R_2$ is applied in the form of output signals U, R, D, and L to the neighboring memory elements. In the diagram, symbol $S_C$ indicates a signal to the counter. Since the circuit uses no capacity element, the working time depends solely upon the switching time of the silicon controlled rectifier $SCR_2$ and hence the operation can be accomplished at a very high speed. FIG. 7 establishes a memorized condition when $SCR_1$ conducts and an inverted condition when $SCR_1$ and $SCR_2$ are both conductive.

Although some examples of memory elements have been described, it is similarly possible to use magnetic cores in constituting those memory elements. The scanning device to scan the memory which is composed of these memory elements may be any device which can sequentially select the memory elements and apply signals thereto in a predetermined way. For example, it may be a device of known type which consists of a matrix for memory selection and a counter A variety of systems may be adopted for the scanning device. For example, upon receipt of an output signal $S_C$ from a memory element which indicates the presence of a picture element, the device may temporarily stop the scanning operation and resume it after the lapse of a certain period time with the ensuring memory element, or restart the scanning all over again, or go on scanning without any interruption. Further, the same pattern may be scanned by different scanning systems so as to obtain more information.

As described hereinbefore, the system for extracting features of patterns according to the invention makes it possible to detect in a simplified way the number of partial figures and the number of closed curves of patterns which have hitherto been hardly discernible and also to determine the approximate positions of those partial figures and closed curves.

In accordance with the invention, a plurality of the memories above described may be used in a combination to detect complicated patterns such as multiple loops; and by a plurality of memories composed of memory elements coupled in different ways, features of dissimilar types such as directional features can be extracted.

Further, according to the invention, pattern recognizing apparatus very quick in action and yet inexpensive can be provided to outstanding practical advantages because features can be extracted simply without resorting to complicate operation process but by using different memories or different scanning methods for the same quantized pattern.

While I have shown and described only a few embodiments of the present invention, it will be understood that the same is not limited thereto but is susceptible of numerous changes and modifications as known to a person skilled in the art. I therefore do not wish to be limited to the details shown and described herein but intend to cover such modifications and changes as are within the scope of the appended claims.

We claim:

1. A feature-extracting system for pattern-recognizing apparatus and the like which comprises:

memory means comprised of a number of memorizing circuits for memorizing quantized partial feature signals of a pattern to be extracted, each of said memorizing circuits including a first input terminal for receiving a quantized partial feature signal for storage so as to be placed into a storing state upon receipt of a quantized partial feature signal, a second input terminal for receiving a readout order signal so that a memorizing circuit is reset from the storing state when it has stored therein a quantized partial feature signal and at least one output terminal for providing an output signal only when said circuit has stored therein a quantized partial feature signal by said circuit and in response to receipt of a readout order signal thereby;

processing means for supplying quantized partial feature signals of a pattern to the first input terminals of said respective memorizing circuits selectively;

scanning means for sequentially supplying a readout order signal to the second input terminal of each said memorizing circuit to scan said memory means;

coupling means for selectively electrically coupling the output terminal of each said memorizing circuit with the second input terminals of a limited number of the other memorizing circuits adjoining thereto, whereby the output signal of the former circuit is introduced to the second input terminals of the latter circuits as a readout order signal; and output means connected to the output terminal of each memorizing circuit for providing a counting signal only when a readout order signal from said scanning means is applied to said memorizing circuit storing a quantized partial feature signal.

2. The feature-extracting system according to claim 1, wherein said memory means is a means for memorizing noninverted quantized partial feature signals of the pattern to be extracted.

3. The feature-extracting system according to claim 1 wherein said memory means is a means for memorizing inverted quantized partial feature signals of the pattern to be extracted.

4. The feature-extracting system according to claim 1 wherein said output means further includes counting means for counting the number of counting signals for the period during which all of said memorizing circuits are scanned by said scanning means.

5. The feature-extracting system according to claim 1 wherein said memory means is comprised of at least first and second groups of said memorizing circuits connected to said processing means, one of said first and second groups being for memorizing quantized partial feature signals of the pattern to be extracted derived from said processing means, and the other one for memorizing inverted quantized partial feature signals thereof derived from said processing means.

6. The feature-extracting system according to claim 5 wherein said output means further includes first and second counting means connected to said first and second groups of memorizing circuits, respectively, for counting the number of counting signals derived therefrom for the period during which all of said memorizing circuits are scanned by said scanning means.

7. The feature-extracting system according to claim 1 wherein said memory means is composed of plural groups of said memorizing circuits connected to said processing means, at least one of which is connected with another one of said groups for transferring signals inverted with respect to the quantized partial feature memorized in the former group to the latter group.

8. The feature-extracting system according to claim 1 wherein said memorizing circuits comprise:

a capacity element connected with said first input terminal for storing said partial feature signal;
a switching element connected across said capacity element for selectively discharging the capacity element;
means for controlling conductivity of said switching element in response to said readout order signal supplied from said second input terminal; and means detecting variation in current through said switching element for supplying an output signal to said output terminal.

9. The feature-extracting system according to claim 8 wherein said switching element consists of a discharge tube.

10. The feature-extracting system according to claim 8 wherein said switching element consists of a silicon controlled rectifier.

11. The feature-extracting system according to claim 8 wherein said memorizing circuits further comprise an additional switching element connected across said capacity element for discharging the element, and means for actuating said additional element by a reset signal.

12. The feature-extracting system according to claim 11 wherein said additional switching element consists of an electrical relay actuated by said reset signal.

13. The feature-extracting system according to claim 11 wherein said additional switching element is composed of a silicon controlled rectifier actuated by said reset signal.

14. The feature-extracting system according to claim 1 wherein said memorizing circuits comprise:

a first series circuit consisting of an electrical source, a transistor, a first silicon controlled rectifier and a first resistor;
a second series circuit consisting of a second silicon controlled rectifier and a second resistor, connected across said first resistor;
means for supplying a control signal to the control electrode of said transistor to control conductivity thereof;
means for supplying said feature signal from said first input terminal to a control terminal of said first rectifier to control conductivity thereof;
means for supplying said readout order signal from said second input terminal to a control terminal of said second rectifier to control conductivity thereof; and
means for detecting a variation in current through said second rectifier to supply an output signal to said output terminal.